United States Patent [19]

Hyodo et al.

[11] 4,020,790

[45] May 3, 1977

[54] APPARATUS FOR FORMING COATING ON A TUBULAR TEXTILE JACKET

[75] Inventors: Masakatsu Hyodo; Hitoshi Inoue, both of Osaka, Japan

[73] Assignee: Ashimori Kogyo Kabushiki Kaisha (Ashimori Industry Co., Ltd.), Osaka, Japan

[22] Filed: Aug. 2, 1974

[21] Appl. No.: 494,304

[30] Foreign Application Priority Data

Aug. 4, 1973 Japan .............................. 48-87897
Mar. 22, 1974 Japan .............................. 49-32340

[52] U.S. Cl. .................................. 118/44; 118/419; 26/80; 425/460; 427/434 R
[51] Int. Cl.² ........................ B05C 3/12; D06C 5/00
[58] Field of Search ............ 118/44, 419, DIG. 10, 118/405, DIG. 11, DIG. 12, DIG. 13; 117/94, 95; 425/72, 403, 460, 426 R; 26/55, 56, 80, 81, 82, 83, 84, 85; 294/95, 290

[56] References Cited

UNITED STATES PATENTS

| | | | |
|---|---|---|---|
| 1,215,419 | 2/1917 | Shields | 26/55 R |
| 2,339,151 | 1/1944 | Cohn et al. | 26/55 R |
| 3,201,827 | 8/1965 | Reynolds et al. | 26/55 R |
| 3,204,317 | 9/1965 | Hurt et al. | 26/55 R |
| 3,296,343 | 1/1967 | Buttolph et al. | 26/81 X |
| 3,370,116 | 2/1968 | Wrede | 26/55 R UX |
| 3,437,537 | 4/1969 | Takada | 117/94 |
| 3,616,502 | 11/1971 | Aronoff | 26/85 |

FOREIGN PATENTS OR APPLICATIONS 742,075   11/1943   Germany ................. 26/55 R
940,339   10/1963   United Kingdom ............... 26/55 R

*Primary Examiner*—Mervin Stein
*Attorney, Agent, or Firm*—Birch, Stewart, Kolasch and Birch

[57] ABSTRACT

A method for forming a coating of rubber or a synthetic resin having an even thickness on the external surface of a tubular textile jacket made of fibers woven or knitted in a tubular form, which comprises continuously passing the tubular textile jacket through one or more baths of a coating liquid and then solidifying the coating liquid attached to the external surface of the jacket, characterized in that an expanding assembly provided with plural expanding members which are capable of inflating the tubular textile jacket to almost circular or elliptical form in its cross section and are arranged at appropriate intervals in the longitudinal direction of the assembly is put in the interior space of the jacket and maintained in a definite position to the coating liquid in the baths, thereby keeping the jacket almost circular or elliptic in its cross section at least for a distance from the position where the tubular textile jacket departs from the bath of coating liquid to the position where fluidity of the coating liquid attached to the external surface of the jacket is substantially lost. The use of the expanding assembly provided with plural expanding members capable of inflating the tubular textile jacket by mechanical pressure which are arranged at appropriate intervals in the longitudinal direction of the assembly overcomes drawbacks in the prior arts and warrants a smooth coating operation for the jacket without trouble.

8 Claims, 21 Drawing Figures

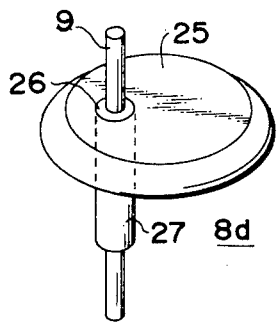
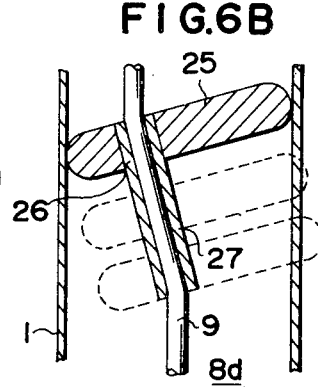
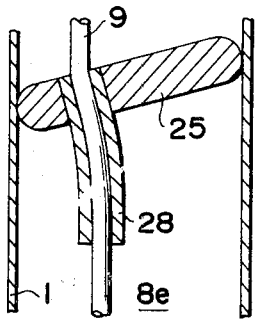
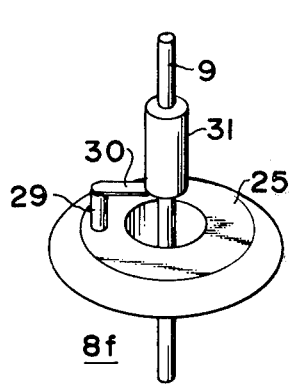
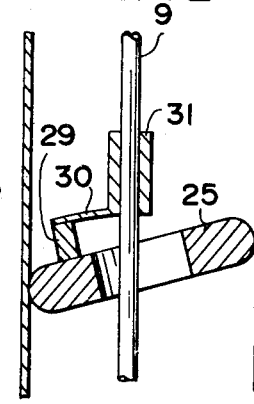
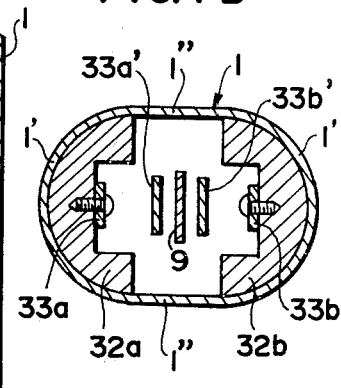
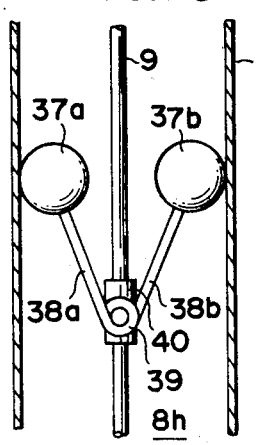
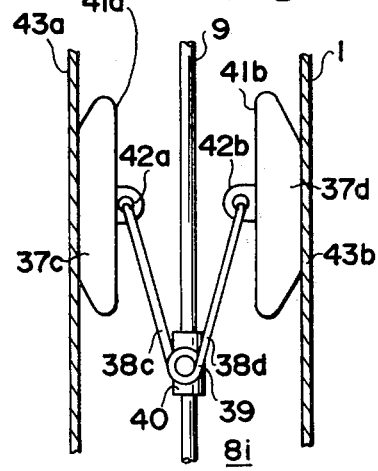

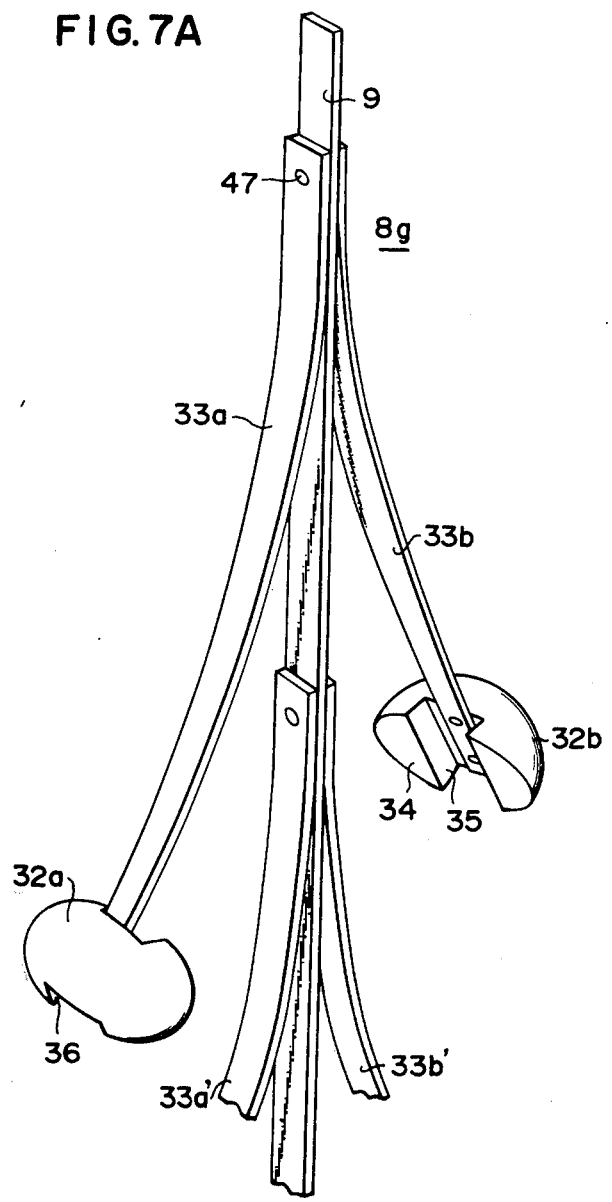

APPARATUS FOR FORMING COATING ON A TUBULAR TEXTILE JACKET

BACKGROUND OF THE INVENTION

1. Field of the Invention

This invention relates to an improved apparatus for forming a coating of rubber or a synthetic resin having an even thickness on the external surface of a tubular textile jacket. More particularly, this invention relates to the use of an expanding assembly provided with one or more expanding members in the method for forming a coating of rubber or a synthetic resin on the external surface of a tubular textile jacket, the expanding members being capable of inflating the tubular textile jacket circularly or elliptically in its cross section when packed thereinto and keeping the jacket inflated during the step of solidifying a coating liquid applied onto the external surface of the jacket by drying or vulcanization.

2. Description of the Prior Art

A method for forming a coating of rubber or a synthetic resin on the external surface of a tubular textile jacket is already disclosed in British Pat. No. 957,929 relating to improvements in the method of manufacturing fire hose which comprises forming a coating on the external surface of a hose jacket and turning it inside out. This patent discloses two methods for the first step of forming the coating on the external surface of a hose jacket. One method comprises passing a hose jacket in flattened state through a bath of a latex or plastisol and then vulcanizing or gelling the coating on the external surface of the hose jacket, while the other method comprises inserting an air-tight air bag into the interior space of the hose jacket, supplying air in the air bag to inflate the hose jacket, passing the inflated jacket as such through a bath of a latex or plastisol and then vulcanizing or gelling the coating on the external surface of the hose jacket.

These methods are the simplest ones for forming a coating on the external surface of a tubular textile jacket. However, these methods are complicated in practical operation and have a number of defects as will be detailed hereinafter. Thus, these methods make themselves unsuited for the manufacture of commercially valuable products having a uniform coating thereon.

In the firstly mentioned method wherein a hose jacket is passed in flattened state through a bath of a latex or plastisol, a difference in surface curvature is made between the flattened broad areas and the folded edge areas of the hose jacket and a significant difference in flow state is found between the liquid attached to the flattened broad areas and that attached to the folded edge areas; the quantity of liquid attached to the folded edge areas becomes smaller than that attached to the flattened broad areas, and as the result, a coating layer formed after solidification of the liquid becomes extremely thin in the folded edge areas. According to this method, therefore, a coating of an even thickness cannot be formed on the external surface of the hose jacket and two longitudinally extending lines where the coating is smaller in thickness will appear in the diametrically opposite positions of the resulting product. Such thinly coated areas in the hose jacket give a detrimental effect to the commercial value of the product and will tend to form pinholes when the hose jacket is subjected to further treatments including evagination, pressure test, etc. for manufacturing the desired fire hose. Such pinholes will prove fatal defect to fire hose. On the other hand, the external coating formed in the folded edge areas of the hose jacket is comparatively thin and most damageable by external force or friction. Thus, there is a fear of injury in such areas during the subsequent treatment for manufacturing fire hose. The firstly mentioned method thus fails to produce a coating of an even thickness and rather serves to minimize the merit achieved by forming a coating on the external surface of hose jacket.

In the secondly mentioned method wherein the formation of such external coating is conducted while the hose jacket is inflated by the aid of an air bag packed thereinto, no problem arises in the formation of an external coating having an even thickness unlike the firstly mentioned method. However, this method also has several serious drawbacks. In practice of this method, an air bag has to be inserted into the tubular textile jacket over the full length thereof and therefore some additional operations including insertion of an air bag into the interior of jacket, elevation of air pressure in the air bag and taking out of the air bag from the jacket after the formation of external coating are requird, thus making the procedure extremely complicated. Extremely difficult in the technical point of view for this method is to seal the air bag perfectly for preventing leakage of air therefrom. Even a slight leakage of air incurs shrinkage of the inflated hose jacket and finally results in the formation of a coating having uneven thickness. In this case, leaked air is released through voids in the reticulate structure of the fibrous jacket whereby a coating once formed is broken to cause the formation of pinholes or cracks on evagination of the hose jacket. Moreover, the hose jacket inflated according to this method by the aid of pressurized air bag is stiff and so is hardly curved. Thus, storage of the inflated hose jacket needs a considerably large space. If the inflated hose jacket is forcedly curved with a smaller radius of curvature, smooth curving will no longer be attained and the hose jacket will be curved with an angle in several positions. If the running course of inflated hose jacket is changed during the operation, rolls having a diameter of at least one meter will be needed to warrant smooth curving of the inflated jacket, thus resulting in considerable enlargement of the apparatus.

Accordingly, the secondly mentioned method is also commercially unattractive in every respect of space, apparatus and expenses and has complexity and difficulty in technical operations.

To overcome these serious defects in the prior arts, there was already proposed an improved method for forming a coating of rubber or a synthetic resin having an even thickness on the external surface of a tubular textile jacket (Japanese Pat. Appln. No. 58446/1972). This method, i.e. the improved prior method comprises packing into the interior space of a tubular textile jacket drawn upwardly from a bath of a coating liquid an expanding member capable of inflating the tubular jacket to almost circular form in its cross section, for example, a self-rotatable endless double tubing or steel balls and then maintaining the inflated jacket in a definite position to the bath of coating liquid thereby keeping the jacket inflated at least for a distance from the position where the tubular textile jacket departs from the bath of coating liquid to the position where the coating liquid attached to the external surface of the jacket becomes no longer fluid.

According to the improved prior method wherein such specific expanding member is used, a tubular textile jacket running in a bath of a coating liquid is kept almost circular in its cross-section and continuously kept in this state for a certain distance after drawn from the bath, whereby the flow state of the liquid attached to the external surface of the tubular jacket is maintained identical all over the external surface to permit the formation of a coating of an even thickness all over the external surface. Once the liquid attached to the external surface of a tubular textile jacket has been solidified to a certain degree to lose its fluidity, the running jacket may be flattened and turned at a roll with a smaller diameter. Thus, the improved prior method is advantageous in respect of space for treating the jacket and needs no troublesome operation for putting in and out the air bag.

This method is, therefore, superior to the methods disclosed in the aforementioned British patent but still has some shortcomings. Since an article (endless double-tubing) used in this method as the expanding member and inserted into the interior space of a tubular textile jacket may be regarded as one of the air bags, a somewhat troublesome operation is also required for perfectly sealing the endless double-tubing. The technical merit of the improved prior method over the British patent is that several hundred to several thousand tubular textile jackets can be treated according to this method with only one endless double-tubing, while one air bag is required for each one of the hose jackets according to the method of the British patent. Although this technical merit fully covers difficulty in perfectly sealing the endless double-tubing, further improvement is demanded in the operation for putting in and out the expanding member. In the improved prior method using the endless double-tubing, leakage of air or a fluid may also occur during the operation. In this case, sudden shrinkage of the inflated double-tubing takes place, thus resulting in the formation of a coating having uneven thickness as in the case of the British patent. In case the coating operation is carried out repeatedly with plural endless double-tubings by passing a tubular textile jacket continuously through a plurality of coating baths arranged in series, leakage of the content in one or two endless double-tubing may not incur serious damage to the product. However, such leakage phenomenon is quite undesirable in practice of the improved prior method and should be avoided. To overcome these defects in the improved prior method, therefore, there is still a great demand for development of an improved method for carrying out the coating operation without any trouble.

BRIEF SUMMARY OF THE INVENTION

Accordingly, it is an object of this invention to provide an improved apparatus for forming a coating of an even thickness on the external surface of a tubular textile jacket.

It is another object of this invention to provide an economically attractive method for coating the external surface of a tubular textile jacket with rubber or a synthetic resin in a simple manner which overcomes drawbacks in the prior arts.

It is still another object of this invention to provide a tubular textile jacket having on its external surface a coating of rubber or a synthetic resin having an even thickness.

It is further object of this invention to provide an improved expanding member which, when inserted into the interior space of a tubular textile jacket, can keep the jacket almost circular in its cross-section without causing any trouble for an extended period of time.

It is still further object of this invention to provide an expanding assembly which comprises plural expanding members, a holder for maintaining the assembly at a definite position to the coating liquid in the bath and one or more connecting members for the expanding members.

These and other objects, features and advantages of this invention will become apparent more fully as the description proceeds.

BRIEF DESCRIPTION OF THE DRAWINGS

FIG. 4-B is a cross-sectional view showing another example of a combination of an expanding member and a connecting member.

FIG. 4-C is a side view of another example of a combination of an xpanding member having rings and connecting members.

FIG. 5-C is a perspective view showing a combination expanding member.

FIG. 5-D is a plane view of the combination expanding member shown in FIG. 5-C.

FIG. 5-E is a perspective view showing a cylindrical expanding member comprising plural pressing parts and a cushion interposed between the individual pressing parts.

FIG. 5-F is sectional view of the cylindrical expanding member shown in FIG. 5-E cut along the line a—a.

FIG. 6-A is a perspective view showing one example of a disk-type expanding member eccentrically arranged for the connecting member.

FIG. 6-B is a sectional view (longitudinal) of the disk-type expanding member of FIG. 6-A put in the interior space of a tubular textile jacket.

FIG. 6-C is a sectional view (longitudinal) of another example of a disk-type expanding member similar to that of FIG. 6-A put in the interior space of a tubular textile jacket.

FIG. 6-D is a perspective view showing one example of a doughnut-type expanding member cocentrically arranged for the connecting member.

FIG. 6-E is a sectional view (longitudinal) of the doughnut-type expanding member of FIG. 6-D put in the interior space of a tubular textile jacket.

FIG. 7-A is a perspective view showing an example of a different type expanding member consisting of separate pressing parts.

FIG. 7-B is a cross sectional view of the expanding member of FIG. 7-A put in the interior space of a tubular textile jacket.

FIG. 7-C is a sectional view (longitudinal) of one modification of the expanding member of FIG. 7-A put in the interior space of a tubular textile jacket.

FIG. 7-D is a sectional view (longitudinal) of another modification of the expanding member of FIG. 7-A put in the interior space of a tubular textile jacket.

DETAILED DESCRIPTION OF THE INVENTION

Figure 1:
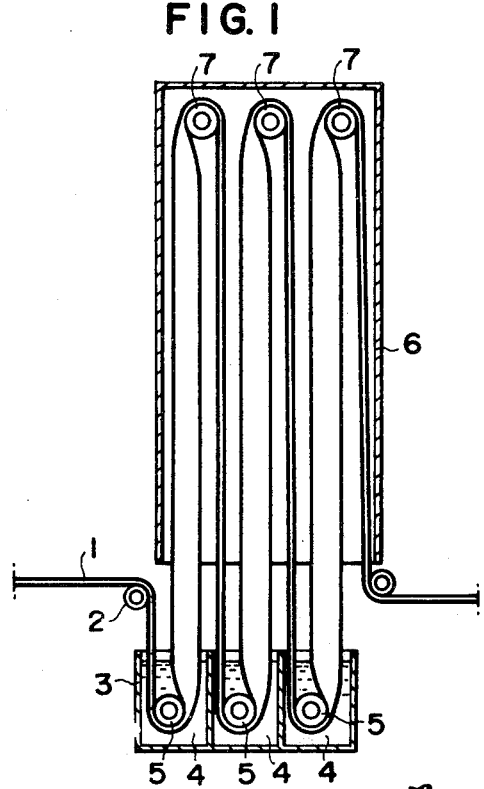
FIG. 1 is a diagram showing a typical example of the apparatus useful in practice of this invention.

It has now been found that the above mentioned drawbacks in the prior arts including the improved prior method can be overcome by using as a means for inflating a tubular textile jacket to almost circular or elliptical form in its cross section an expanding assembly having plural expanding members arranged at appropriate intervals in the longitudinal direction.

In accordance with this invention, therefore, there is provided a method for forming a coating of rubber or a synthetic resin having an even thickness on the external surface of a tubular textile jacket made of fibers woven or knitted in a tubular form, which comprises continuously passing the tubular textile jacket through one or more baths of a coating liquid and then solidifying the coating liquid attached to the external surface of the jacket, characterized in that an expanding assembly provided with plural expanding members which are capable of inflating the tubular textile jacket to almost circular to elliptical form in its cross section and are arranged at appropriate intervals in the longitudinal direction of the assembly is put in the interior space of the jacket and maintained in a definite position to the coating liquid in the baths, thereby keeping the jacket almost circular or elliptic in its cross section at least for a distance from the position where the tubular textile jacket departs from the bath of coating liquid to the position where fluidity of the coating liquid attached to the external surface of the jacket is substantially lost.

The expanding members are preferably made of hard wood, plastics, anticorrosive metals or a combination of these materials and are connected serially along the longitudinal axis to form an expanding assembly. The expanding assembly normally comprises, in addition to the expanding members, a holder for maintaining the assembly in a definite position to the coating liquid in the bath and one or more connecting members for connecting the individual expanding members to the main body of the assembly and arranging them in series along the longitudinal axis.

According to the improved method of this invention using an expanding assembly provide with plural specific expanding members, a tubular textile jacket running in a bath of a coating liquid is kept almost circular or elliptical in its cross section and continuously kept in this state for a certain distance after drawn upwardly from the bath without fear of any rupture or shrinkage of the expanding member. Therefore, the improved method of this invention warrants the formation of a coating with an even thickness all over the external surface of the jacket without trouble. The externally coated tubular textile jacket is then heated, while kept in inflated condition, to solidify the coating liquid on its external surface. The coating treatment and the heating treatment are usually carried out continuously by traveling the externally coated jacket through a heating zone where the jacket is heated at a temperature necessary for solidifying the coating liquid for a sufficient period of time. Hot blast and heating means taking advantage of infra-red rays are preferably used as heat source. By heating, any solvent contained in the coating liquid is evaporated and vulcanization or curing of rubber or resin takes place if a vulcanizing agent or polymerization accelerator is contained in the liquid.

In practice of this invention, a tubular textile jacket may directly be passed through a coating liquid. In case the jacket is made of a relatively loose texture and the viscosity of a coating liquid is loq, the coating liquid will penetrate through the loose retiform texture to the internal surface of the jacket and cause any trouble in the final product. In such case, therefore, the tubular textile jacket is preferably passed, prior to coating treatment, through a clogging liquid to clog the pervious loose reticulate structure therewith. The treatment per se for applying a clogging liquid to the jacket is almost same as in the case of applying a coating liquid to the jacket. The clogging jacket is selected generally from a latex, solution or paste of rubber or a synthetic resin having a viscosity of 5000–20000 cp. It is preferably to use the same kind of clogging liquid as the coating liquid.

When the coating liquid attached to the external surface has been solidified, the running jacket may be flattened and turned to change its running direction by means of a roll having a small radius, thus making it possible to minimize the space required for coating operation.

In this invention, the tubular textile jacket may be any of the fibrous materials woven or knitted in a tubular form. Preferred fibrous materials are natural and synthetic organic fibers such as cotton, linen, glass, regenerated cellulose, polyamide and polyester.

The coating liquid is generally in the form of a viscous liquid such as latex, solution or paste of natural or synthetic rubber or a synthetic resin and forms, when heated on the tubular textile jacket, a water-insoluble coating. A latex of natural or synthetic rubber is particularly preferred in this invention. The coating liquid may contain a vulcanizing agent, polymerization accelerator and other additives such as plasticizer, colorant and the like usually employed for the purpose of coating.

This invention will now be described in more detail with reference to the accompanying drawings.

Referring to FIG. 1 showing a typical example of the apparatus useful in practice of this invention, a tubular textile jacket 1 in flattened condition is supplied from an adequate supplying device (not shown) and dipped through a guide roll 2 into a coating liquid 4 placed in a bath container 3. The coating liquid 4 may be any of lattices, solutions, plastisols and organosols of rubber and synthetic resins capable of being solidified by drying or gelatin to afford a coating film. The downardly running jacket 1 is dipped into the coating liquid 4 and then turned upwardly by the action of a lower roll 5 provided rotatably in the coating liquid. An expanding assembly is inserted into the interior space of the upwardly running jacket 1 so as to inflate it by the internal mechanical pressure of plural expanding members mounted to the assembly. The expanding assembly is maintained at a definite position to the coating liquid 4 in the container 3 by a suitable means and the jacket 1 alone is permitted to run upwardly while sliding on the surface of the expanding members.

Among the plural expanding members mounted to the expanding assembly, the lowermost one is situated in such manner that the pressing point thereof is positioned at a height equal to or lower than the level of the coating liquid 4. Accordingly, the jacket 1 drawn from the coating liquid 4 is kept in fully inflated state and carries the liquid 4 evenly attached onto the external surfaces thereof. The upwardly running jacket 1 is inflated only in the place where it is brought into contact with the mechanically pressing area of the expanding member. However, as plural expanding members are provided in the assembly at appropriate intervals along the upwardly extending longitudinal axis, the upwardly running jacket 1 is continuously inflated at least for a distance corresponding to the length of the expanding assembly without allowing the jacket 1 to be flattened again by its own elasticity. The jacket 1 runs upwardly while in inflated condition and enters into a heating oven 6 where the jacket 1 is heated by hot blast, infra-red ray lamp or the like. The coating liquid 4 is solidified by drying when the liquid is in the form of a latex or solution but is solidified by gelation when the liquid is in the form of a plastisol or organosol. Among the plural expanding members mounted to the expanding assembly, the uppermost one is situated in a position where the coating liquid 4 attached onto the external surface of the jacket 1 is solidified to a certain degree and loses it fluidity or in a higher position. When the upwardly running jacket 1 becomes higher than the upper end of the heating oven 6, therefore, the coating liquid on the external surface of the jacket has lost its fluidity and the resulting coating layer will no longer change in its thickness. When the upwardly running jacket 1 exceeds the upper and of the expanding assembly, inflation of the tubular jacket is no longer maintained and is gradually flattened while permitting proceeding of solidification of the coating to a tough film. The upwardly running jacket 1 is again turned downardly by the action of an upper roll 7 provided rotatably in the upper position of the heating oven 6. The jacket 1 is entirely kept in flattened condition when turnedd by the action of the upper roll 7 or lower roll 5. Consequently, the diameter of each roll may not be so large and in fact the jacket can easily be turned by the action of rolls with a small diameter. The jacket 2 is kept in flattened condition during its running downwardly into the coating liquid. The upper roll 7 may be provided in the heating oven 6 as shown in FIG. 1 or far above the ceiling of the heating oven 6. The latter mode is generally preferable. In case the upper roll exists in the heating oven 6, the coating on the external surface of the jacket is somewhat softened by superheating and tends to be damaged. When the roll 7 is kept away from the oven 6, the coating is somewhat cooled and is not affected by heat, thus attaining the coating operation safely. If necessary, the externally coated tubular textile jacket is again dipped into the coating liquid and the treatment may be repeated until a coating layer of the desired thickness is obtained on the external surface of the jacket 1. FIG. 1 shows the coating treatment in three cycles but the number of cycles is not limited thereto. In general, the number of cycles in the coating treatment depends on the viscosity and solid concentrations of the coating liquid, the desired thickness of coating and the like factors. The downwardly running jacket 1 may be passed, as shown in FIG. 1, through the oven 6. In case the jacket 1 is repeatedly dipped into the coating liquid 4 in such manner, the coating liquid may probably be heated by the jacket kept at a high temperature, thus resulting in any denaturation of the liquid. When the coating operation for the jacket 1 is repeatedly carried out, therefore, the heated jacket will better be taken out of the oven 6 and allowed to descend in a cooled state to the coating bath. After the formation of a coating with a desired thickness, the jacket is taken out via a guide roll 8.

Examples of the expanding assembly of this invention will now be explained with reference to the drawings starting from FIG. 2.

Figure 2:
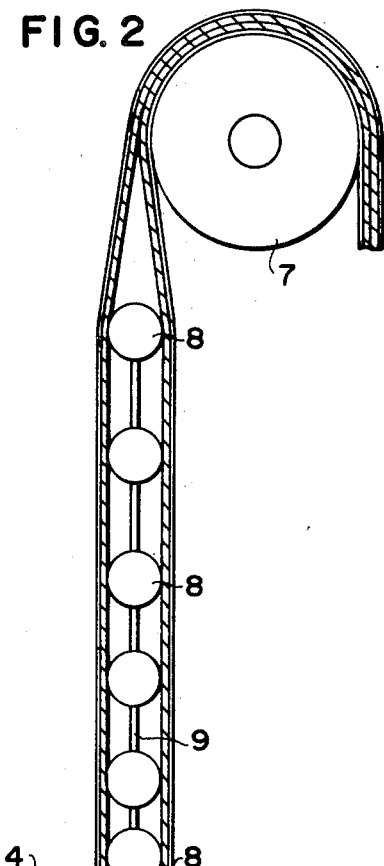
FIG. 2 is a sectional view (longitudinal) of one complete unit of the apparatus of FIG. 1 wherein an expanding assembly provided with plural expanding members arranged in series in the longitudinal direction is put in the interior space of a tubular textile jacket.

In FIG. 2 showing one complete unit of the coating apparatus of FIG. 1, an expanding assembly is put in the interior space of the ascending part of the tubular textile jacket 1. In the expanding assembly, plural expanding members designated by the numeral 8 are arranged at appropriate intervals. Each expanding member 8 is nearly spherical and has a diameter almost equal to the internal diameter of the jacket 1. If the expanding members alone are put in the interior space of the ascending jacket 1, they will be held tightly by elasticity of the jacket and ascend together. Hence, a certain device is required for holding the expanding members in a fixed position. A connecting member 9 is used to connect all of the expanding members and its lower end is provided with a holder 10 which functions to maintain the expanding assembly within the upwardly running jacket 1 at a definite height or position. In this case, it is necessary that the lower part of the assembly is below the level of the coating liquid 4 placed in a bath container 3. In FIG. 2, the holder 10 of the assembly is supported externally by means of a pair of support rolls 15 and 15' to keep the assembly in a definite position. When the tubular textile jacket 1 dipped into the coating liquid 4 is turned to ascend by means of a lower roll 5 and drawn upwardly, the jacket 1 is inflated to almost circular form in its cross section by mechanical pressure of the expanding members put in the interior space of the jacket, and at the same time, the ascending force of the jacket 1 acts as a strong frictional force on the expanding members 8 and the holder 10 both in intimate contact with the ascending jacket. However, the holder 10 of the expanding assembly is supported externally by a pair of the support rolls 15 and 15' which inhibit the assembly from its ascending, thus serving to maintain the expanding assembly in a fixed position. As the expanding members are made of a hard material, for example, a hard resin or stainless steel and arranged at appropriate intervals, the operation for coating the external surface of the jacket evenly with rubber or a synthetic resin can be carried out without accompanying drawbacks as seen in the prior art methods, such as shrinkage or rupture of the expanding members during the operation. No particular limitation is required for the type and size of the lower roll 5 and the upper roll 7.

The connecting member 9 is preferably a flexible rope which, even if the tubular textile jacket oscillates during its upwardly running, readily respond to the movement of the jacket so that the expanding members can mechanically press the whole internal surface of the jacket evenly. Any of the tough materials can be used as the connecting member so far as it is at least flexible. The term "flexible" required for the connecting member is referred to herein as such property that when one terminal end is fixed, the other terminal end can move more than the diameter of the tubular textile jacket by a weak force.

Figure 3:
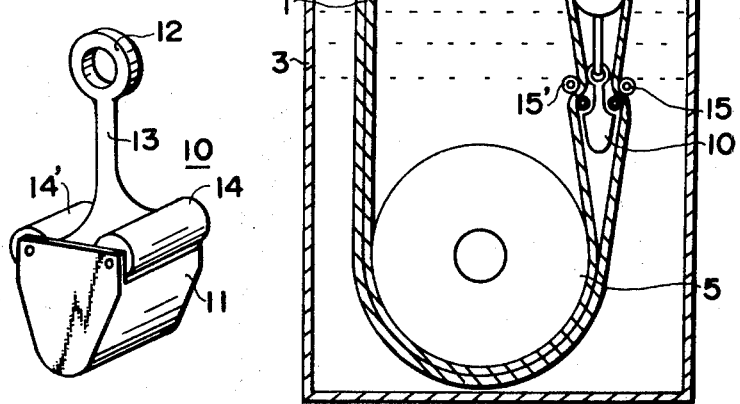
FIG. 3 is a perspective view of a holder constituting a part of an expanding assembly.

In FIG. 3, a holder 10 comprises a wedge-shaped main body 11, a neck 13 extending upwardly from the main body 11 and having a ring 12 at the top thereof and two internal support rolls 14 and 14' rotatably mounted, in a parallel direction to the external support rolls 15 and 15' in FIG. 2, to both shoulder parts of the main body 10. The ascending tubular textile jacket travels between the internal support rolls 14 and 14' and the external support rolls 15 and 15' while rotating them.

Figure 4A:
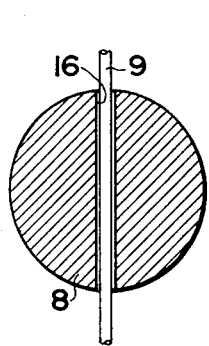
FIG. 4-A is a cross-sectional view showing one example of a combination of an expanding member and a connecting member.
Figure 4B:
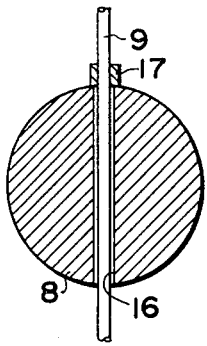
Figure 4C:
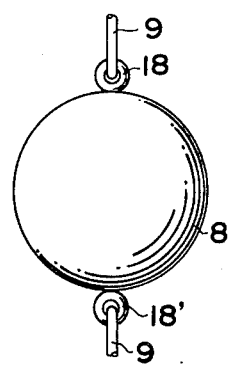
Figure 5A:
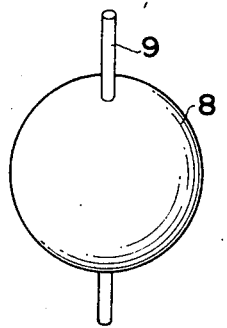
FIG. 5-B is a perspective view showing a disk-type or cylindrical expanding member.
Figure 5B:
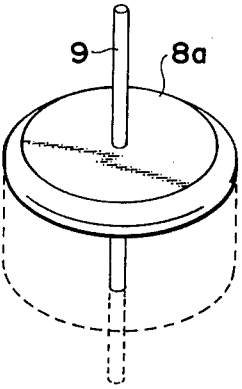
Figure 5C:
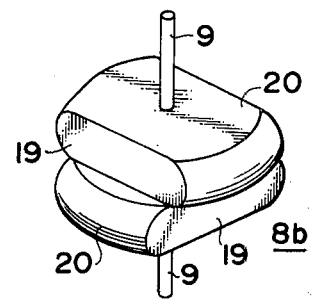
Figure 5D:
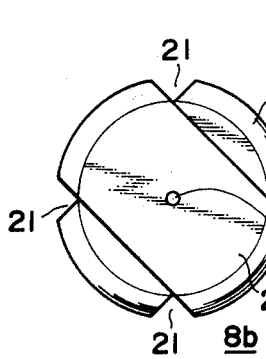
Figure 5E:
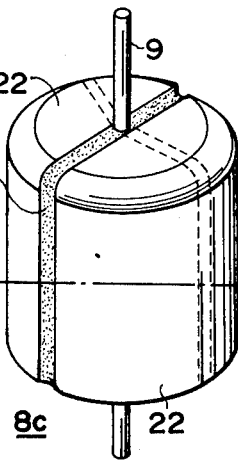
Figure 5F:
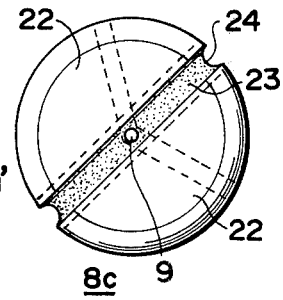

FIGS. 4-A to 4-C show various combinations of the expanding members and the connecting members. In FIG. 4-A, a spherical expanding member 8 is bored along the central axis to form a hole 16 through which a connecting member 9 is penetrated. In the hole 16, the connecting member is bonded to the expanding member by the aid of an adhesive. In another example shown in FIG. 4-B, a connecting member 9 is penetrated through a hole 16 and a stopper 17 is formed at the top of the expanding member 8. The ascent of the member 8 is prevented by the stopper 17. In case a rope is used as the connecting member 9, it may be knotted at the top of the expanding member 8 to form a stopper 17. In still another example shown in FIG. 4-C, rings 18 and 18' are provided respectively at the top and bottom of the expanding member 8 and a connecting member is attached to each ring. The mode of junction between the expanding member 8 and the connecting member 9 is not limited to these exampls. As the ascending force alone acts upon the expanding members, the connecting member has to complete only with this force. Accordingly, the expanding members 8 and the connecting member 9 need not be fixed firmly but may be joined simply so far as the ascent of the expanding members is prevented.

FIGS. 5-A to 5-F show various shapes of the expanding members having a substantially circular form when projected to a plane perpendicular to the longitudinal direction of the tubular textile jacket. By the use of expanding members of this type, the jacket can be inflated to almost circular form in its cross section to warrant the formation of a coating having an even thickness over the whole external surface of the jacket.

In FIG. 5-A, the expanding member 8 is spherical and is identical with that shown in FIG. 4-A and FIG. 2.

In FIG. 5-B, the expanding member 8a is a disk with a round periphery and is almost equal in the inflating effect to that of the spherical one shown in FIG. 5-A,. In the case of the spherical expanding member, only a central portion thereof having the maximum diameter contributes to expand the tubular textile jacket. Accordingly, deformation of the spherical shape to the disk shape having an equal maximum diameter by removing the upper semi-spherical portion and the lower semi-spherical portion causes no difference in the effect. A disk-type expanding member as shown in FIG. 5-B is rather advantageous from the economical point of view, for example, in saving the material and in decreasing the weight of the whole expanding assmelby. If the contacting portion of the spherical or disk expanding member is not effective to expand a particular tubular textile jacket having a tendency to return to the folded state, the expanding member may be shaped into a cylindrical form with or without round corners as shown by the dotted line in FIG. 5-B. The use of such cylindrical expanding member brings about a large contact area for the jacket and serves to minimize the tendency to return to the holded state.

A satisfactory result can be expected by the use of these spherical, disk and cylindrical expanding members. However, these members also have a shortcoming in practical use. It is generally difficult to maintain the internal diameter of tubular textile jacket precisely constant, as the knitted or woven fibrous articles have a coarse surface. On the other hand, it is impossible to produce an unlimitedly long tubular textile jacket. Practically, the length of commercially available tubular textile jacket is at most about several hundred meters. To carry out the method of this invention continuously, terminal ends of these tubular textile jacket are joined to form a substantially endless tubular textile jacket which is then supplied to the coating apparatus. In this case, the expanding members of the above mentioned types are unable to pass through a locally narrow portion and a connected portion of the tubular textile jacket. If the expanding members are made smaller so that they can pass through such portions, the effects for expanding the jacket and for minimizing the tendency of the jacket to return to the folded state will greatly be reduced.

Several exampls shown in FIG. 5-C et seq are suitable as expanding members for overcoming the aforesaid defects.

In an example shown in FIG. 5-C, an expanding member 8b comprises two pressing parts 20 combined at right angles, which have been manufactured by cutting disks each with a round periphery at two parts of the periphery to form cut portions 19. A connecting member 9 penetrates through the center of the expanding member 8b. The projection of this expanding member to a plane perpendicular to the longitudinal direction of the tubular textile jacket is a nearly circular form with a diameter slightly larger than the internal diameter of the jacket 1 as shown in FIG. 5-D which is a plane view of the expanding member of FIG. 5-C. The peripheral length of the individual pressing parts 20 is smaller than that of the internal surface of the jacket 1 due to the cut portion 19. Thus, the jacket can readily pass in the condition slightly deformed by the individual pressing parts 20 while being inflated to almost circular form in its cross section.

At least one cut portion is necessary in each pressing part. When the pressing parts are combined, they should be arranged so that the cut portions do not meet each other. Even if the cut portions meet each other to a small extent to form a break-overlapped portion 21, this will not result in substantial reduction of the expanding effect, so far as the circular shape of the whole expanding member is retained. At least two pressing parts must be used but the number of the pressing parts may freely be increased at will.

In FIG. 5-E, an expanding member 8c comprises a cylindrical pressing part 22 in at least two segments between which a cusion 23 made of rubber or a plastic material is interposed. This cylindrical pressing part 22 has preferably round edges in both sides and a connecting member 9 penetrates through the central point of the expanding member 8c. The diameter of the expanding member 8c is responsible to the change of the inner diameter of the tubular textile jacket. If the inner diameter of the jacket becomes small during the coating operation, the cushion 23 will be shrinked in proportion to the change of the internal diameter so that the expanding member permits smooth passage of the jacket without losing its expanding effect on the jacket. The pressing part 22 may be divided into more than two segments, for example, three or four segments, as shown by dotted lines in FIGS. 5-E and 5-F.

FIG. 5-F is a cross sectional view of the cylindrical expanding member 8c of FIG. 5-E cut along the line a—s'. In a practical application, the expanding member 8c is inserted preferably in somewhat shrinked state into the interior space of a tubular textile jacket so as to maker the expanding member responsible by expansion also to a slight increase in the internal diameter of the jacket. Shrinkage or expansion itself of the expanding member 8c is effected by the cushioning action 24 of the cushion 23.

In all examples shown in FIGS. 5-A to 5-F, the shape of the expanding member 8, 8a, 8b or 8c is commonly circular when projected to a plane perpendicular to the longitudinal direction of the jacket. Thus, they can inflate the tubular textile jacket to almost circular form when put therein. Since inclination of the expanding members is not preferred in this embodiment, the connecting member 9 should connect the expanding members along the longitudinal central axis.

FIGS. 6-A to 6-E show some different types of the expanding member. The expanding members shown in these drawings comprises a disk-type pressing part 25 having a diameter slightly larger than the inner diameter of a tubular textile jacket. In a practical application, the pressing part in inserted in inclined state into the interior space of the tubular textile jacket and a rotating force is added in the direction towards decreasing the inclination angle whereby the jacket is inflated to an elliptical form in its cross section. The inclination angle of the pressing part may be varied adequately according to the hange in the internal diameter of the jacket.

In FIG. 6-A, an expanding member 8d comprises a disk-type pressing part 25 provided with a hole 26 in a place somewhat distant from the center, through which a rigid pipe 27 has been penetrated. One terminal end of the pipe 27 is fixed to the pressing part 25 and the other terminal extends downwardly. In this example, the connecting member 9 is a flexible rope and penetrates through the pipe 27 and is fixed thereto. The various connecting means as shown in FIGS. 4-A, 4-B and 4-C and be adopted for connecting the pipe 27 with the rope 9. In case the connecting means as shown in FIG. 4-C is adopted, for example, the pipe 27 may be a mere solid hood on the pressing part 25.

FIG. 6-B is a sectional view (longitudinal) of the expanding member of FIG. 6-A put in the interior space of a tubular textile jacket. As shown by dotted lines in this FIG., the disk-type pressing part 25 may be fixed at the middle or lower terminal portion of the tube 27. As the diameter of the pressing part 25 in the expanding member 8d is larger than the internal diameter of the tubular textile jacket, the pressing part 25 slants in the jacket and the rope 9 is bent at both ends of the pipe 27. Since many expanding members 8d are connected to the rope 9, tension is applied to the rope 9 when the tubular textile textile jacket 2 runs upwardly. Accordingly, a momentum in clock-wise direction is exerted to the expanding member 8d due to the tension of the rope 9, and as the result, the pressing part 25 tends to be horizontal. Due to this force the pressing part 25a mechanically presses the internal surface of the tubular textile jacket 1 which is thus inflated to an ellipsoid form in its cross section similar results can be obtained by using the extending member 25 in which the pressing part 25a is fixed to the pipe 27 in the place shown by dotted lines in FIG. 6-B. In case the pressing part 25 is fixed to the lower portion of the pipe 27, however, the upper end of the pipe 27 may touch the inner surface of the jacket 1 and injure it if the inclination angle of the expanding member 8d becomes larger where the internal diameter of the jacket 1 is locally small. Accordingly, it is desirable to arrange the pressing part 25 and the pipe 27 as shown by the solid line in FIG. 6-A or 6-B.

In FIG. 6-C, an expanding member 8e is substantially identical with that shown in FIG. 6-B except that a tubular element 28 is not a rigid pipe but a tube of an elastic or flexible material or a spiral (coil) spring of a resilient metal such as steel. Examples of the elastic or flexible material include hard rubber, thermostable plastic resins and resilient metal wire-used materials such as wire-reinforced resin, wire-woven tubes, etc. When the expanding member 8e is inserted into the interior space of a tubular textile jacket 1, the pressing part 25 slants as in the case of the expanding member 8d. If the rope 9 is pulled in this state by upwardly acting tension, the element 28 is bent by elasticity in response to the pulling force, that is the tension of the rope 9. In the expanding member 8e, the rope 9 is bent only slightly. Accordingly, the influence of inclination of the expanding member 8e is not transferred to other expanding members, and a momentum in clock-wise direction is exerted to the pressing part 25 by the elasticity of the element 28 whereby the tubular textile jacket is satisfactorily expanded. The junction between the element 28 and the rope 9 and that between the element 28 and the pressing part 25 may be effected in the same manner as shown by the dotted lines in FIG. 6-B.

Irrespective of whether the element 28 is a tube of an elastic or flexible element or a spiral spring or a metal, equivalent technical effect and merit can be obtained by the method of this invention.

In FIG. 6-D showing another example of the expanding members, a doughnut-type pressing part 25 is arranged cocentrically for the connecting member, i.e. a rope 9. The upper surface of the pressing part 25 is provided a suspender 29 which, at the upwardly extended terminal end, is fixed to one terminal end of an elastic connector 30. The other terminal end of the connector 30 is fixed to the lower end of a pipe 31 through which a connecting member 9 penetrates along a cocentric axis with the doughnut-type pressing part 25. The elastic connector 30 must firmly be fixed on both terminal ends to the suspender 29 and the pipe 31 while the connecting member 9 must firmly hold the pipe 31. An elastic material utilizable for the connector 30 may be identical with that used in the tubular element 28 shown in FIG. 6-C. In case a spiral spring of a resilient metal such as steel is used as the connector 30, all of the related parts 29, 30 and 31 may be made of one continuous spiral spring.

FIG. 6-E is a sectional view (longitudinal) of the doughnut-type expanding member of FIG. 6-D put in the interior space of a tubular textile jacket.

When the expanding member 8f is inserted into the interior space of a tubular textile jacket, the pressing part 25 is inclined as shown in FIG. 6-F and the connector 30 is bent due to its elasticity. However, inclination of the pressing part 25 does not cause bending of the pipe 31 and so the connecting member 9 extends straight. Accordingly, inclination of the pressing part 25 is not influenced upon other expanding members.

The pressing part 25 receives a momentum in clockwise direction by elasticity of the connector 30 and inflates the jacket 1 by the internal pressing force.

In case the suspender 29, the connector 30, and the pipe 31 in the expanding member 8f are integrally made of one continuous spiral spring, the lower terminal end of the spiral spring is fixed to the pressing part 25, the wire of the spiral spring at the middle portion is partly straightened to form the connector 30 and the upper terminal end of the spiral spring is fixed to the connecting member 9.

In this expanding member, the rotating momemtum of the pressing part 25 is brought about by elasticity of the straightened portion 30 of the spiral spring and the lower part of the spiral spring constituting the suspender 29.

In examples shown in FIG. 6-A to 6-E, the tubular textile jacket is not inflated to a complete circular form in its cross section but to a semicircular elliptical form. Hence, the curvature of the tubular textile jacket is not maintained constant throughout its periphery. However, the difference in curvature which arises in this case is not significant enough to cause substantial difference in fluidity of the coating liquid on the jacket. Thus, a practically uniform coating can be obtained on the external surface of the jacket.

In the use of various types of expanding members shown in FIGS. 6-A to 6-E, preferable connecting members for connecting the former serially are flexible materials such as rope. Especially, in examples shown in FIGS. 6-A and 6-B wherein the connecting members are locally bent, they must be readily flexible ones like rope. On the other hand, in examples shown in FIGS. 6-D and 6-E wherein the connecting member 9 is arranged cocentrically with the expanding members, the connecting member 9 may not be bent and thus may be a hard material so far as it is more or less flexible. If the connecting means for expanding members as shown in FIG. 4-C is adopted for connecting the expanding members shown in FIGS. 6-A and 6-C, however, the connecting members 9 may not be readily flexible ones.

In FIG. 7-A, an expanding member 8g consists of a pair of pressing parts 32a and 32b each in a semi-ellipsoid shape which are connected to a vertically extending connecting member 9 through connectors 33a and 33b, respectively. The connectors are mounted to the member 9 by means of a pin 47. On the flat surface 34 of each of the pressing parts 32a and 32b, a groove 35 is formed, to which one terminal end of the connector 33a or 33b is fixed. The connectors 33a and 33b are made of leaf springs and are slightly curved outward. The other terminal end of the connector 33a' or 33b' is fixed to the connecting member 9 which may also be made of a leaf spring and thus may be resilient. The periphery of an ellipsoid formed by combining the pressing parts 32a and 32b is sightly smaller than the internal circumference of a tubular textile jacket. When this expanding member 8g is inserted into the tubular textile jacket so that the pressing parts 32a and 32b may touch the inner surface of the folded jacket, the pressing parts are pushed by the inner surface of the tubular textile jacket and come nearer to each other because of the resiliency of the connectors 33a and 33b made of leaf springs. Accordingly, the pressing parts 32a and 32b press the inner surface of the tubular textile jacket because of repulsive resiliencey of the connectors 33a and 33b and inflate the folded tubular textile jacket.

FIG. 7-B is a cross sectional view of the expanding member of FIG. 7-A put in the interior space of a tubular textile jacket. As shown in FIG. 7-B, a tubular textile jacket 1 is inflated to an almost elliptical form in its cross section by the internal mechanical pressure of the pressing parts 32a and 32b. The folded edge areas 1' of the jacket 1 are thus sufficiently expanded. On the other hand, the flat areas 1" of the jacket 1 are not internally pressed but these areas are pulled from both sides by the action of the pressing parts 32a and 32b, thus permitting the formation of neither furrow nor wrinkle in these areas. No problem arises in the coating operation for the jacket thus inflated.

In FIG. 7-C showing one modification of the expanding member of FIG. 7-A, an expanding member 8h consists of a pair of spherical pressing parts 37a and 37b. A forceps-shaped spring 39 is mounted to a small pipe 40 through which a connecting member 9 penetrates. Two legs 38a and 38b of the spring 39 are open at an angle to form connectors for the pressing parts 37a and 37b. The base of the spring 39 mounted to the pipe 40 is shaped into a short spiral to absorb any external force applied to the pressing parts when the diameter of the jacket varies.

In FIG. 7-D showing another modification of the expanding member of FIG. 7-A, a pair of pressing parts 37c and 37d is shaped into a boat with a round bottom. Rings 42a and 42b are provided in the centers of the inner flat surfaces 41a and 41b and a forcepts-shaped spring 39 is mounted to a small pipe 40 through which a connecting member 9 penetrates. Two legs 38c and 38d of the spring 39 are open at an angle to form connectors for the boat-shaped pressing parts 37c and 37d and the terminal ends of the legs are bent to form hooks which are inserted into the rings 42a and 42b. In the expanding member 8i thus constructed, the pressing parts 37c and 37d have a certain length. If the pressing parts 37c and 37d and the two legs 38c and 38d of the spring 39 are fixed, the outer surfaces 43a and 43b of the pressing parts 37c and 37d, which should contact over the whole areas with a tubular textile jacket 1, will touch the jacket 1 only at an angle when the angle between the two legs 38c and 38d of the spring 39 changes, thus reducing the merit that the tubular textile jacket is inflated over a certain length. Accordingly, the pressing parts 37c and 37d and the legs 38d of the spring 39 should be connected so that they are movable to some extent. For example, the boat-shaped pressing parts 37c and 37d are preferably mounted so as to be rotatable around the rings 42a and 42b, respectively, when the angle between the two legs 38c and 38d varies.

In the various examples shown in FIGS. 7-A, 7-C and 7-D, the connecting member 9 should rather be made of a relatively rigid material. The pressing parts of these expanding members expands only the folded edge areas (shown in FIG. 7-B as numeral 1') of a tubular textile jacket. Thus, the pressing parts must correctly be placed inside the folded edge area 1'. If the connecting member 9 is freely twisted or if the expanding members rotates around the connecting member, the location of the pressing parts will probabaly be changed. Hence, the connecting member 9 should be made of a relatively rigid material which is not readily twisted, and the connectors 38a, 38b, 38c and 38d should be fixed firmly to the connecting member 9 so that they can hardly rotate around the connecting member. It is a matter of course, however that the connectors should be mounted to the connecting member 9 in such manner that they are movable back and forth and bilaterally to some extent. This is due to the reason that even if the tubular textile jacket sways to some extent during the coating operation, the connectors precisely respond to such sway so that the pressing parts may be located just inside the folded edge areas 1' of the jacket 1. In the example shown in FIG. 7-A, the connectors 33a and 33b and the connecting member 9 are connected by a single pin, leaving the freedom of the connectors 39 and 39' to sway slightly.

In mounting the connectors to the connecting member 9 in the case of allowing a tubular textile jacket to run upwardly from the lower side, there are two ways; in one way, the connectors are mounted in such manner that the two legs may extend downwardly as shown in FIG. 7-A, and in the other way, the connectors are mounted in such manner that the two legs may extend upwardly as shown in FIGS. 7-C or 7-D. The former mode is more desirable for the following reason. A holder 10 is usually fixed at the lower end of the connecting member 9. In the latter mode wherein the legs as connectors extend upwardly as shown in FIGS. 7-C and 7-D, even if the connectors for the lowermost expanding members are attached immediately above the holder, the pressing parts will be situated further above. Accordingly, the tubular textile jacket is not inflated over the length corresponding to that of the connectors. Since the tubular textile jacket should generaly come out of the coating liquid bath in an inflated state, the holder 10 will have to be placed deeper in the bath and accordingly more coating liquid will have to be used than is actually necessary. On the other hand, if the connectors are connected so that their legs extend downwards as shown in FIG. 7-A, the tubular textile jacket could be inflated immediately above the holder. This brings about more beneficial effects in practice of this invention.

The legs of connectors are preferably as long as possible. If the legs are long, the angle between the two open legs will change only slightly in response to the change in the diameter of the tubular textile jacket. Accordingly, the change in the force by which the inner surface of the tubular textile jacket is internally pressed is negligibly slight and the tubular textile jacket can be pressed by a constant force. If necessary, the same expanding assembly provided with the expanding members as shown in FIGS. 7-A, 7-C and 7-D may be used for treating several kinds of tubular textile jacket with different diameters. It is desirable that the length of the connectors is at least twice as large as the diameter of the tubular textile jacket used. However, it is not indispensable in practice of this invention that the connectors are always so long. For example, if a tubular textile jacket with very little variation in diameter is to be inflated over a long distance from the place immediately above the holder to the place immediately beneath the upper roll, the connectors are preferably as short as possible. If they are too long, the portion between the uppermost pressing parts and the upper roll is not inflated over the length corresponding to that of the connectors.

In the expanding assemblies provided with the foregoing various types of expanding members, the intervals between the individual expanding members need not be constant. The intervals should rather be shorter in the lower part of the tubular textile jacket and longer in the higher part, as shown in FIG. 2. The tubular textile jacket in the lower part of the expanding assembly has a strong tendency to return to the folded state as it has been folded flat. Even if the jacket is inflated by the action of the first expanding member, the jacket tends to return to the folded state due to the elasticity of the tubular textile jacket itself. In order to get rid of this tendency, therefore, the tubular textile jacket must be inflated frequently by the action of a number of expanding members located at short intervals. On the other hand, the coating liquid immediately after applied onto the external surface of the tubular textile jacket is not yet cured and has a relatively low viscosity. Thus, the coating liquid on the external surface of the jacket located in the lower part of the expanding assembly is apt to flow. Hence, a small irregularity in shape of the jacket is apt to cause uneven thickness of the resulting coating. Contrary to this, the jacket located in the upper part of the expanding assembly has a little tendency to return to the folded state, as it has been inflated many times and the coating liquid on the external surface is partly solidified. Under such condition, the tubular textile jacket is kept inflated, even if the intervals between the expanding members are long. As the coating liquid attached to the external surface of the jacket is partly or completely dried or gelled under such condition, the coating layer has a high viscosity and does not flow readily. If the tubular textile jacket is flattened at this stage, the thickness of the coating will scarcely vary. It is not necessary to use only one kind of the expanding members for one expanding apparatus. Several kinds of different expanding members may be combined in an appropriate order and used in one expanding assembly without causing any change in effects.

According to this invention, the tubular textile jacket is passed in an inflated state through a coating liquid and the attached coating liquid is dried while the jacket is kept inflated. Thus, the thickness of the resulting coating is kept even over the entire surface of the jacket. In addition, the expanding members have a simple strufture and enable a longer and economically more stable operation than the air bags which may incur shrinkage or rupture during the operation.

In aforementioned various embodiments, tubular textile jackets are drawn upwardly after they have passed through a bath of a coating liquid and the expanding assembly is inserted into their ascending portions. It is to be understood, however, that the assembly may be put in the interior space of the jacket when the jacket is drawn downwardly or horizontally after they have passed through a bath of a coating liquid. In this case, it should also be understood that the upward and downward directions in the foregoing descriptions on the expanding assemblies and members mean respectively the front and backward directions with regard to the movement of the tubular textile jacket.

The method of this invention is particularly useful as a step for forming a uniform coating on the external surface of a tubular textile jacket in a method for manufacturing a hose for high pressure liquids, for example, fire hose by forming a coating of rubber or a synthetic resin on the external surface of a tubular textile jacket and turning it inside out. Further, the method of this invention can advantageously be employed to apply an external coating to a hose for improving its durability.

What is claimed is:

1. An expanding assembly for maintaining a tubular textile jacket in a substantially circular or elliptical cross-sectional shape for a predetermined distance while a coating is applied to the exterior surface of the jacket and said coating is solidified, which comprises a connecting member attached to extend longitudinally along the interior surface of the tubular jacket, a plurality of spring members each having a fixed end and a free end, said fixed end being attached to the connecting member at intervals along the longitudinal direction of said connecting member, the free end of each of said spring members being provided with a pressing element so that said pressing element is joined to said connecting member by said spring member, said spring member pressing against the internal surface of the textile jacket, thereby maintaining said jacket in said substantially circular or elliptical cross-sectional shape and a holding member disposed at one terminal end of said expanding assembly for maintaining it in a definite position within the tubular textile jacket.

2. The expanding assembly of claim 1, wherein the spring members are spring-biased resilient members which extend outwardly at an angle from the connecting member.

3. The spring assembly according to claim 1, wherein said pressing element has a semiellipsoidal form and the connecting member and expanding members are made of leaf springs.

4. The expanding assembly according to claim 1, wherein said pressing element has a spherical shape.

5. The expanding assembly according to claim 1, wherein said pressing element has a boat shape.

6. The expanding assembly according to claim 1, wherein said spring members are arranged in series in the longitudinal direction in such a manner that the interval between the spring members is increased as the distance from the coating application is increased.

7. The expanding assembly according to claim 1, wherein several different kings of spring members are utilized in a predetermined order of succession.

8. The expanding assembly according to claim 1, wherein the spring members are spring connectors.

* * * * *